(12) United States Patent
Wang et al.

(10) Patent No.: US 8,964,160 B2
(45) Date of Patent: Feb. 24, 2015

(54) SUBSTRATE ASSEMBLY AND LIQUID CRYSTAL DISPLAY PANEL

(75) Inventors: Po-Hsien Wang, Taichung (TW); Chih-Chiang Cheng, Yunlin County (TW)

(73) Assignees: Dongguan Masstop Liquid Crystal Display Co., Ltd., Guangdong Province (CN); Wintek Corporation, Taichung (TW)

( * ) Notice: Subject to any disclaimer, the term of this patent is extended or adjusted under 35 U.S.C. 154(b) by 778 days.

(21) Appl. No.: 13/187,551

(22) Filed: Jul. 21, 2011

(65) Prior Publication Data

US 2012/0026436 A1  Feb. 2, 2012

(30) Foreign Application Priority Data

Jul. 30, 2010 (TW) .............................. 99125378 A

(51) Int. Cl.
  *G02F 1/1339* (2006.01)
  *G02F 1/1333* (2006.01)
  *G02F 1/1341* (2006.01)

(52) U.S. Cl.
  CPC ............ *G02F 1/1339* (2013.01); *G02F 1/1341* (2013.01)
  USPC ........... 349/156; 349/158; 349/155; 349/153; 349/190

(58) Field of Classification Search
  CPC ... G02F 1/1339; G02F 1/1341; G02F 1/1345; G02F 1/13394; G02F 1/13392; G02F 1/133512; G02F 1/133351; G02F 1/1333; G02F 1/133377; G02F 1/133305; G02F 2001/13415
  USPC .......................... 349/153, 190, 155, 156, 158
  See application file for complete search history.

(56) References Cited

U.S. PATENT DOCUMENTS

| | | | | |
|---|---|---|---|---|
| 7,433,011 | B2 * | 10/2008 | Liao | 349/153 |
| 7,868,990 | B2 * | 1/2011 | Chan et al. | 349/153 |
| 2011/0013132 | A1 * | 1/2011 | Chen et al. | 349/155 |

FOREIGN PATENT DOCUMENTS

| | | |
|---|---|---|
| CN | 2722284 | 8/2005 |
| CN | 1752824 | 3/2006 |
| CN | 1776510 | 5/2006 |
| TW | I276883 | 3/2007 |

OTHER PUBLICATIONS

"Office Action of China Counterpart Application", issued on Mar. 5, 2013, p1-p6, in which the listed references were cited.

* cited by examiner

*Primary Examiner* — Mike Qi
(74) *Attorney, Agent, or Firm* — Jianq Chyun IP Office

(57) ABSTRACT

A substrate assembly including a first substrate, a second substrate, a sealant, and a blocking structure is provided. The first substrate has an active area. The sealant is disposed between the first substrate and the second substrate. The sealant assembles the first substrate and the second substrate and separates the first substrate and the second substrate in a cell gap to define a space, wherein the sealant has an injection opening. The blocking structure is disposed on the first substrate and located outside the active area. A distance from the blocking structure to the second substrate is smaller than the cell gap, wherein the blocking structure divides the space into a first area and a second area. The injection opening is merely located inside the first area and the active area is merely located inside the second area.

10 Claims, 7 Drawing Sheets

SUBSTRATE ASSEMBLY AND LIQUID CRYSTAL DISPLAY PANEL

CROSS-REFERENCE TO RELATED APPLICATION

This application claims the priority benefit of Taiwan application serial no. 99125378, filed Jul. 30, 2010. The entirety of the above-mentioned patent application is hereby incorporated by reference herein and made a part of this specification.

BACKGROUND OF THE INVENTION

1. Field of the Invention

The invention relates to a substrate assembly and a liquid crystal display panel and more particularly, to a substrate assembly and a liquid crystal display panel having a sealant with an injection opening.

2. Description of Related Art

Generally, an liquid crystal display (LCD) panel mainly consists of an active device array substrate, a liquid crystal layer, and a color filter array substrate. The process for fabricating the LCD panel includes forming a sealant between the active device array substrate and the color filter array substrate to assemble the two substrates to form a substrate assembly. Next, the liquid crystal layer is injected into the substrate assembly and the sealant is subsequently completely sealed.

The common method for injecting the liquid crystal layer into the substrate assembly includes a vacuum injection process. The vacuum injection process mainly includes placing the substrate assembly and a liquid crystal container filled with liquid crystal materials in a chamber and vacuuming the chamber and the space inside the substrate assembly. Then, the injection opening of the substrate assembly is moved toward the liquid crystal container and rendered contacting the liquid crystal materials. Thereafter, the vacuum of the chamber is released to turn into a non-vacuum state so that the liquid crystal materials are capillary attracted into the injection opening of the substrate assembly through the capillary effect and the pressure variance between the inner portion and the outer portion of the substrate assembly.

However, a foreign object which is served as a contamination in the description may be injected into the substrate assembly accompanying with the liquid crystal materials during injection of the liquid crystal materials into the substrate assembly. If the contamination is electrically conductive, a short circuit may occur inside the LCD panel due to the contamination. Specifically, the probability of the occurrence of the short circuit inside the LCD panel is increased when the LCD panel is pressed. Thus, the LCD panel is characterized by unfavorable quality due to the contamination.

SUMMARY OF THE INVENTION

The invention provides a substrate assembly having a blocking structure to eliminate the undesirable effect causing by the contamination flowing into the substrate assembly.

The invention provides an LCD panel having favorable quality.

The invention provides a substrate assembly including a first substrate, a second substrate, a sealant, and a blocking structure. The first substrate has an active area. The sealant is disposed between the first substrate and the second substrate. The sealant assembles the first substrate with the second substrate and separates the first substrate and the second substrate in a cell gap to define a space, wherein the sealant has an injection opening. The blocking structure is disposed on the first substrate and located outside the active area. A distance from the blocking structure to the second substrate is smaller than the cell gap, wherein the blocking structure separates the space into a first area and a second area, the injection opening is merely located at the first area, and the active area is merely located at the second area.

The invention further provides an LCD panel including the aforesaid substrate assembly, a liquid crystal layer, and an auxiliary sealant, wherein the liquid crystal layer is filled in the space. The auxiliary sealant seals the injection opening.

In view of the above, a blocking structure is disposed on a path of the liquid crystal materials flowing from the injection opening into the active area according to the invention and the blocking structure defines a channel between the first substrate and the second substrate, wherein the gap is smaller than the cell gap. Therefore, the substrate assembly is conducive to block the contamination from flowing into the active area, which improves the quality of LCD panel.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
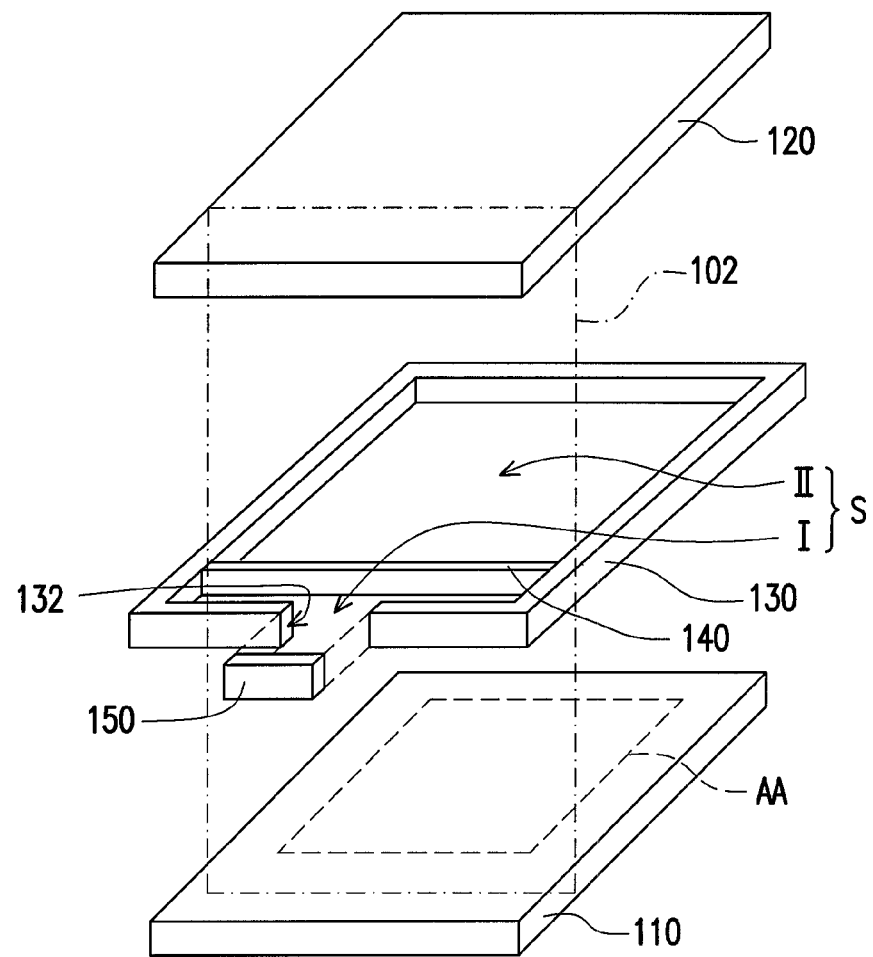
FIG. 1 is a schematic view showing an LCD panel according to one embodiment of the invention.
Figure 2:
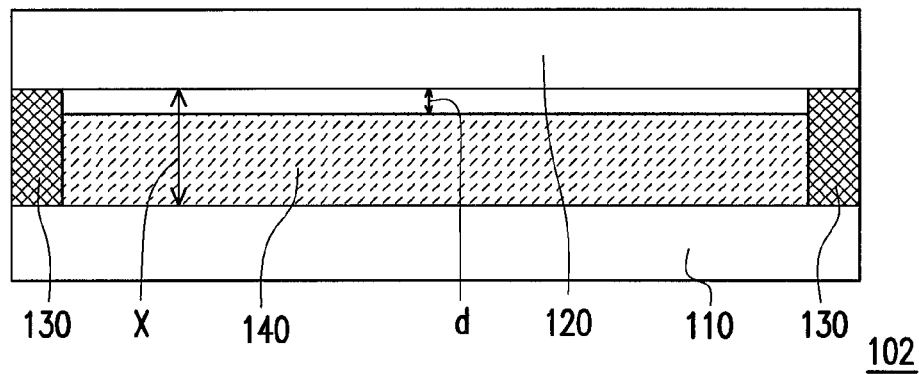
FIG. 2 illustrates an exemplified view showing the cross-section 102 of the LCD panel depicted in FIG. 1.

FIG. 1 is a schematic view showing an LCD panel according to one embodiment of the invention and FIG. 2 illustrates an exemplified view showing the cross-section 102 of the LCD panel depicted in FIG. 1. Referring to FIG. 1, an LCD panel 100 includes a first substrate 110, a second substrate 120, a sealant 130, a blocking structure 140, an auxiliary sealant 150, and a liquid crystal layer (not shown). In the present embodiment, the liquid crystal layer is omitted for clearly representing the drawings and the first substrate 110, the second substrate 120, the sealant 130, and the blocking structure 140 together construct a substrate assembly. In other words, the substrate assembly described in the following content is directed to a structure including the first substrate 110, the second substrate 120, the sealant 130, and the blocking structure 140.

Specifically, the first substrate 110 has an active area AA. The sealant 130 is disposed between the first substrate 110 and the second substrate 120. The sealant 130 assembles the first substrate 110 with the second substrate 120 and separates the first substrate 110 and the second substrate 120 in a cell gap X to define a space S, wherein the sealant 130 has an injection opening 132 so as to facilitate the liquid crystal materials to be filled in the space S through the injection opening 132 to form the liquid crystal layer not illustrated. That is to say, the liquid crystal layer (not shown) is disposed inside the space S. In addition, the blocking structure 140 is disposed on the first substrate 110 and located outside the active area AA. The blocking structure 140 separates the space S into a first area I and a second area II, the injection opening 132 is merely located at the first area I, and the active area AA is merely located at the second area II. The auxiliary sealant 150 is configured to completely seal the injection opening 132 of the sealant 130.

In the present embodiment, the liquid crystal materials pass through the blocking structure 140 prior to flow into the second area II and the active area AA during the process that the liquid crystal materials are injected into the space S via the injection opening 132. Therefore, the blocking structure 140 is conducive to block the contamination, which improves the quality of the LCD panel 100. Referring to FIG. 1 and FIG. 2, a distance d from the blocking structure 140 to the second substrate 120 is smaller than the cell gap X. Therefore, any particle (or contamination) with a particle size larger than the distance d is blocked by the blocking structure 140 and restrained in the first area I during the injection of the liquid crystal materials. Accordingly, the elements disposed on the first substrate 110 are avoided from conducting with the elements disposed on the second substrate 120 through the contamination in the active area AA and an unfavorable short circuit between the first substrate 110 and the second substrate is prevented when the LCD panel 100 is pressed.

For instance, the cell gap X between the first substrate 110 and the second substrate 120 in the active area AA is around 4.25 μm. If the blocking structure 140 is not disposed in the LCD panel 100, the contamination with a particle size close to 4.25 μm can flow into the active area AA, which facilitates the elements disposed on the first substrate 110 conducting with the elements disposed on the second substrate 120 in the active area AA via the contamination. Accordingly, the distance d from the blocking structure 140 to the second substrate 120 is smaller than the cell gap X, e.g. 1 μm smaller than the cell gap X, in the present embodiment, which effectively prevents the contamination having the particle size larger than 1 μm from entering the active area AA so as to improve the quality of the LCD panel 100. In one embodiment, the distance d can be not larger than 1 μm.

The blocking structure 140 illustrated in FIG. 2 is, for example, a continuous wall, wherein the first area I and the second area II are respectively located at two opposite sides of the wall. In addition, two ends of the wall may respectively contact the sealant 130. Namely, the liquid crystal materials pass through the gap between the blocking structure 140 and the second substrate 120 prior to flow into the second area II and the active area AA during the process that the liquid crystal materials are injected into the space S via the injection opening 132. Accordingly, no matter what the flow direction of the liquid crystal materials is, the blocking structure 140 conduces to blocking the contamination with particle larger than the distance d in the first area I. Nonetheless, the two ends of the wall are not necessarily required to contact the sealant 130 in the invention. The two ends of the wall can be selectively separated from the sealant 130 by a distance which is smaller than the cell gap X. In other words, merely the wall is disposed at the boundary of the first area I and the second area II and a channel smaller than the cell gap X in width is formed in the cross section cutting along the blocking structure 140, can the contamination be blocked and restrained, which complies with the spirit of the invention. Therefore, the invention is not limited to the drawings of FIG. 1 and FIG. 2.

Figure 3:
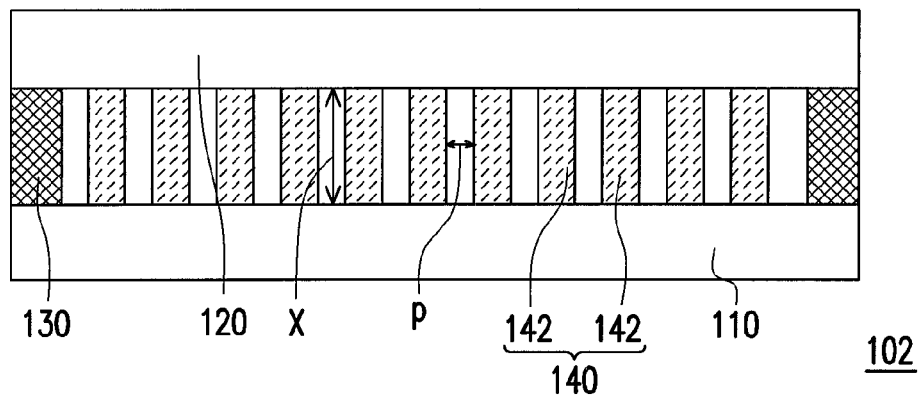
FIG. 3 is another exemplified view showing the cross-section 102 of the LCD panel depicted in FIG. 1.

FIG. 3 is another exemplified view showing the cross-section 102 of the LCD panel depicted in FIG. 1. Referring to FIG. 1 and FIG. 3 together, the blocking structure 140 includes a plurality of pillar 142 and a gap p between adjacent two pillars 142 is smaller than the cell gap X in the present embodiment. Namely, the difference between the present embodiment and the prior embodiment illustrated in FIG. 2 lies in that the blocking structure 140 of the present embodiment is consist of a plurality of independent pillars 142. In addition, in the present embodiment, two ends of each pillar 142 can respectively contact the first substrate 110 and the second substrate 120. Accordingly, the liquid crystal materials pass through the gap p prior to flow into the second area II and the active area AA during the process that the liquid crystal materials are injected into the space S via the injection opening 132. It is difficult for unnecessary contaminations to enter the active area AA, which effectively prevents the elements disposed on the first substrate 110 from conducting with the elements disposed on the second substrate 120 in the active area AA through the contaminations.

Figure 4:
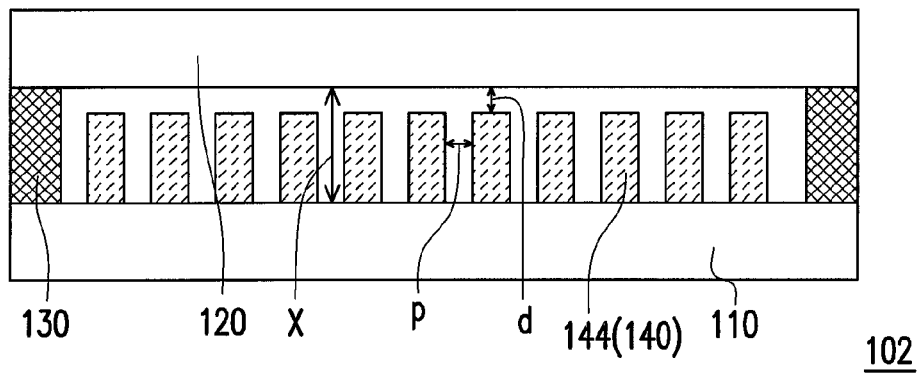
FIG. 4 is further another exemplified view showing the cross-section 102 of the LCD panel depicted in FIG. 1.

Alternately, FIG. 4 is further another exemplified view showing the cross-section 102 of the LCD panel depicted in FIG. 1. Referring to FIG. 4, the blocking structure 140 includes a plurality of pillar 144, wherein a gap p between adjacent two pillars 144 is smaller than the cell gap X and the distance d from each pillar 144 to the second substrate 120 is also smaller than the cell gap X in the present embodiment. In other words, the difference between the pillars 144 and the pillars 142 illustrated in FIG. 3 lies in the design of the height, wherein the pillars 144 do not contact the second substrate 120. In an embodiment, the distance d can be 1 μm smaller than the cell gap X or smaller than 1.μm.

It is noted that the pillars 142 and 144 are represented by rectangles with the same width as illustrated in FIG. 3 and FIG. 4, the cross sections of the pillars 142 and 144 can selectively be in the shape of a trapezoid, a reversed trapezoid, or other forms. As a whole, the cross section of the blocking structure 140 is not particularly restricted in any specific shape in the invention. Any structure disposed between the first substrate 110 and the second substrate 120 and defining a channel smaller than the cell gap X in the cross section can be used as the blocking structure 140 of the invention. Therefore, the above-mentioned structures are only exemplary and not intended to limit the invention. Specifically, the blocking structure 140 of the invention can be compatibly fabricated by the manufacturing process of the first substrate 110. A material of the blocking structure 140 can be the same as at least one element in the first substrate 110. That is to say, no additional manufacturing process is required to fabricate the blocking structure 140 of the invention. Several embodiments are given for illustration below.

Figure 5:
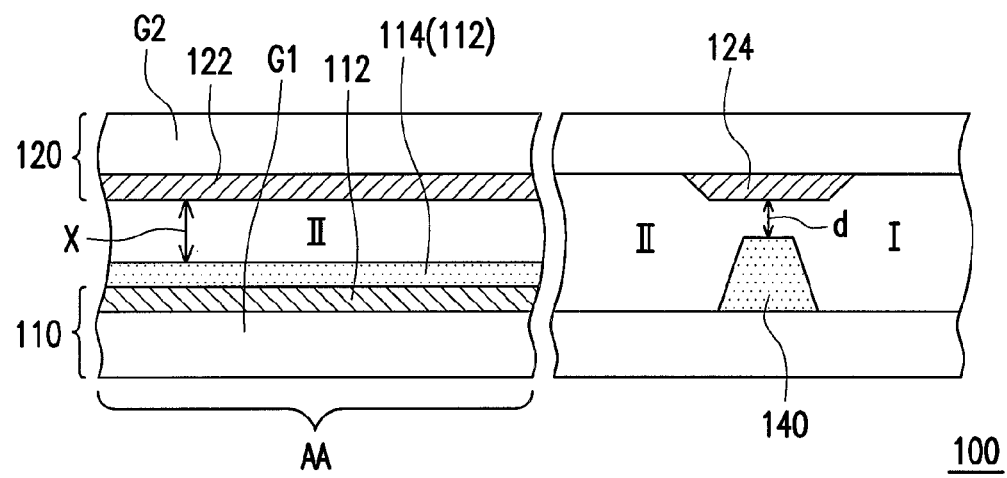
FIG. 5 is a partial cross-sectional view of the LCD panel depicted in FIG. 1 according to an embodiment.

FIG. 5 is a partial cross-sectional view of the LCD panel depicted in FIG. 1 according to an embodiment. Referring to both FIG. 1 and FIG. 5, the first substrate 110 includes a carrier board G1 and an active device array 112 disposed on the carrier board G1, wherein the active device array 112 is located inside the active area AA. In addition, the second substrate 120 includes a carrier board G2 and a color filter array 122 disposed thereon. The color filter array 122 and the active device array 112 are configured to opposite to each other and located in the active area AA. Accordingly, the first substrate 110 is an active device array substrate and the second substrate 120 is a color filter substrate.

The active device array 112 includes a plurality of film layers, e.g. metal layers, insulation layers, a semiconductor layer, and the like, and one of the film layers illustrated in FIG. 5 is an organic material layer 114. It is noted that a material of the blocking structure 140 and a material of the organic material layer 114 are the same in the present embodiment. Therefore, the blocking structure 140 and the organic material layer 114 are fabricated simultaneously, which is conducive to reduce the manufacturing cost of the LCD panel 100.

Additionally, the second substrate 120 is, for instance, further disposed with a padding layer 124 opposite to the blocking structure 140 so that the distance d from the blocking structure 140 to the second substrate 120 is smaller than the cell gap X. The dispositions of the padding layer 124 and the blocking structure 140 facilitate to block the contaminations and prevent from an unnecessary short circuit between the active device array 112 and the color filter array 122.

Figure 6:
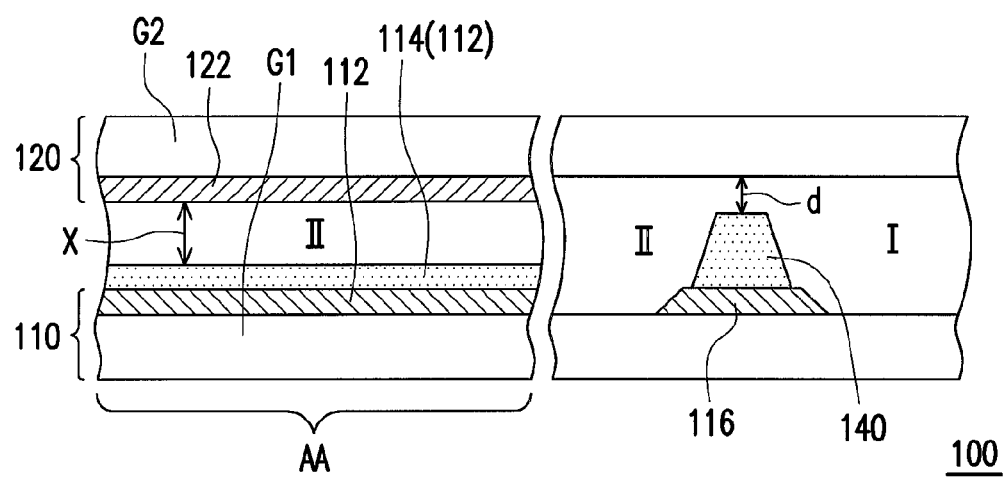
FIG. 6 is a partial cross-sectional view of the LCD panel depicted in FIG. 1 according to further another embodiment.

FIG. 6 is a partial cross-sectional view of the LCD panel depicted in FIG. 1 according to further another embodiment. Referring to FIG. 1 and FIG. 6, the first substrate 110 is an active device array substrate, and the second substrate 120 is a color filter array substrate in the LCD panel 100. The design illustrated in FIG. 6 is substantially similar to that illustrate in FIG. 5 and the same elements are represented by the same reference numbers as illustrated in FIG. 5 and FIG. 6. In the embodiment shown in FIG. 6, the first substrate 110 further includes a padding layer 116 disposed between the blocking structure 140 and the carrier board G1. In addition, the second substrate 120 is selectively disposed without the padding layer as illustrated in FIG. 5.

In the present embodiment, the disposition of the padding layer 116 facilitates to reduce the distance d from the blocking structure 140 to the second substrate 120 so that the distance d is smaller than the cell gap X. In addition to the organic material layer 114, the active device array 112 also includes a plurality of other film layers, e.g. metal layers, insulation layers, a semiconductor layer, or the like. Therefore, the padding layer 116 can be fabricated by using other film layers to reduce the fabricating cost of the LCD panel 100. That is to say, no additional manufacturing process is required to fabricate the padding layer 116 of the invention.

Figure 7:
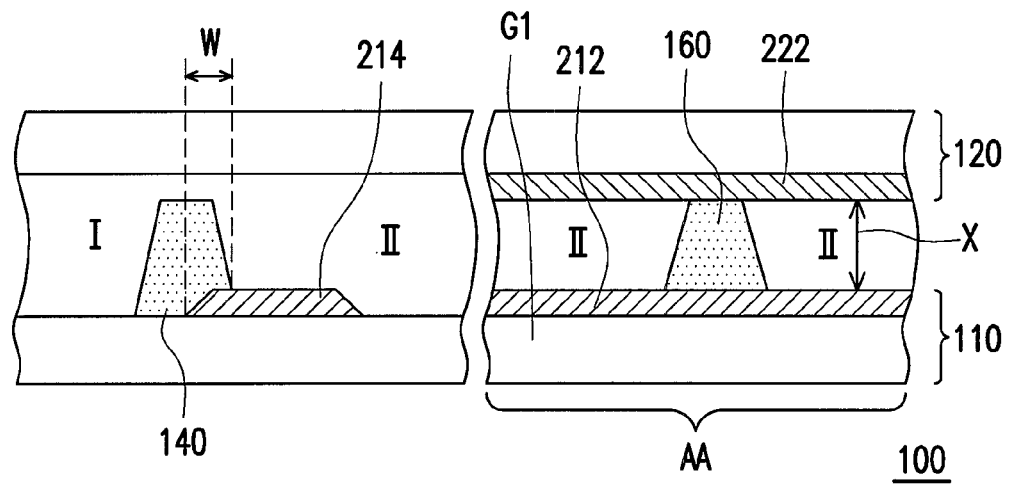
FIG. 7 is a partial cross-sectional view of the LCD panel depicted in FIG. 1 according to yet another embodiment.

In addition to be served as an active device array substrate, the first substrate 110 may be served as a color filter substrate in other embodiments. FIG. 7 is a partial cross-sectional view of the LCD panel depicted in FIG. 1 according to yet another embodiment. Referring to FIG. 7, the first substrate 110 includes a carrier board G1, a color filter array 212, and a padding layer 214, wherein the color filter array 212 and the padding layer 214 are disposed on the carrier board G1 in the LCD panel 100. The second substrate 120 includes a carrier board G2 and an active device array 222 disposed thereon. In the present embodiment, the first substrate 110 is a color filter array substrate and the second substrate 120 is an active device array substrate. The color filter array 212 and the active device array 222 are opposite to each other and located in the active area AA.

It is noted that the LCD panel 100 of the present embodiment further includes at least one spacer 160 disposed between the first substrate 110 and the second substrate 120 to maintain the cell gap X. Moreover, the blocking structure 140 is fabricated by a material of the spacer 140 in the present embodiment. Accordingly, no additional manufacturing process is required to fabricate the blocking structure 140.

For ensuring the reliability of the color filter array 212, dummy pads can be fabricated in the region outside the active area AA during manufacturing the color filter substrate, wherein the dummy pads and the color filter array have the same material. Herein, the dummy pads disposed between the blocking structure 140 and the carrier board G1 can be used as the padding layer 214 in the present embodiment. In the present embodiment, the blocking structure 140 can locally contact the padding layer 214 to maintain a proper height. For example, the overlapping width W of the blocking structure 140 and the padding layer 214 can be smaller than 250 μm, but the overlapping width W can be modified according to the real size of the blocking structure 140.

Figure 8:
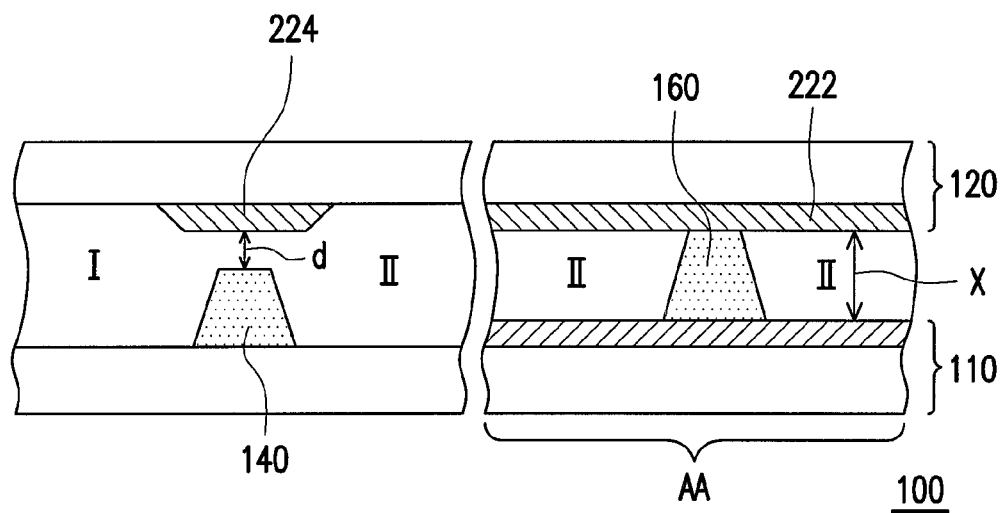
FIG. 8 is a partial cross-sectional view of the LCD panel depicted in FIG. 1 according to still another embodiment.

FIG. 8 is a partial cross-sectional view of the LCD panel depicted in FIG. 1 according to still another embodiment. Referring to FIG. 8, the present embodiment is mostly the same as the embodiment illustrated in FIG. 7, and the difference between the two embodiments is that the blocking structure 140 of the present embodiment is not disposed on a dummy pad and the second substrate 120 of the present embodiment further includes a padding layer 224. The disposition of the padding layer 224 facilitates to render the distance d from the blocking structure 140 to the second substrate 120 smaller than the cell gap X. In addition, the padding layer 224 can have the same material as the active device array 222, i.e. one or more film layers of the active device array 222 and the padding layer 224 can be fabricated simultaneously.

In addition to the aforesaid descriptions depicting the cross section design of the LCD panel according to the invention, the following embodiments are further provided to illustrate the relationships of the blocking structure, the active area, and the sealant in the LCD panel of the invention. It is noted that the reference number 130 is used for representing the sealant, the reference number 132 is used for representing the injection opening, the reference number 140 is used for representing the blocking structure, the reference number AA is used for representing the active area, the reference number I is used for representing the first area, and the reference number II is used for representing the second area in the following embodiments.

Figure 9:
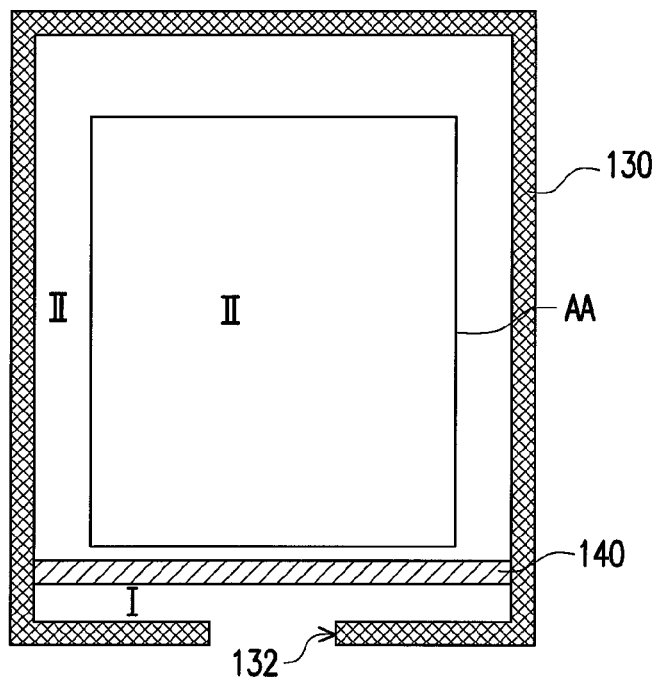
FIG. 9 to FIG. 13 illustrate schematic top views of the blocking structure, the active area, and the sealant in an LCD panel according to a plurality of embodiments of the invention.

FIG. 9 illustrates a schematic top view of the blocking structure, the active area, the sealant in an LCD panel according to an embodiment of the invention. Referring to FIG. 9, the blocking structure 140 is, for example, a straight-linear structure in the present embodiment, and two ends of the blocking structure 140 respectively contact the sealant 130 so that a region surrounded by the sealant 130 is divided into the first area I and the second area II. It is noted that the injection opening 132 is merely located in the first area I. In addition, the blocking structure 140 can be partially overlapped with the sealant 130, wherein the overlapping width is, for instance, not larger than 500 μm.

Figure 10:
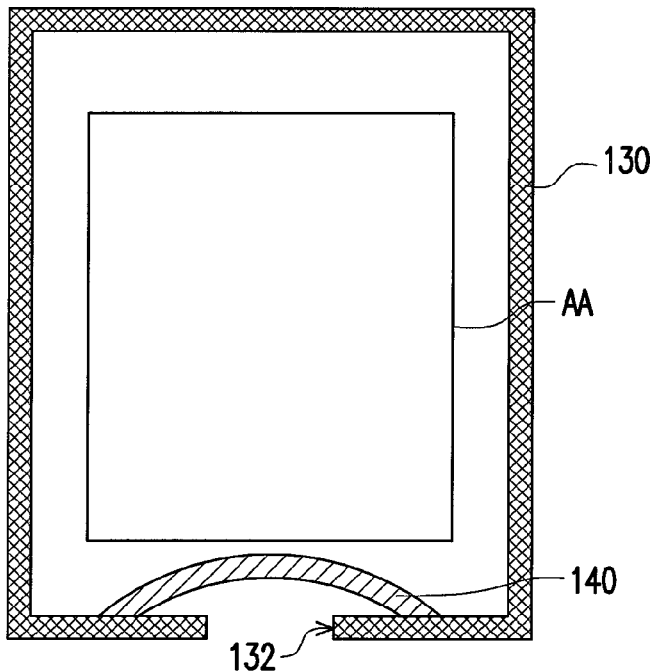

FIG. 10 illustrates a schematic top view of the blocking structure, the active area, the sealant in an LCD panel according to another embodiment of the invention. Referring to FIG. 10, the blocking structure 140 is, for example, an arc-like structure in the present embodiment, and two ends of the blocking structure 140 respectively contact the sealant 130 and are located at two opposite sides of the injection opening 132. In other words, the blocking structure 140 substantially surrounds the injection opening 132.

Figure 11:
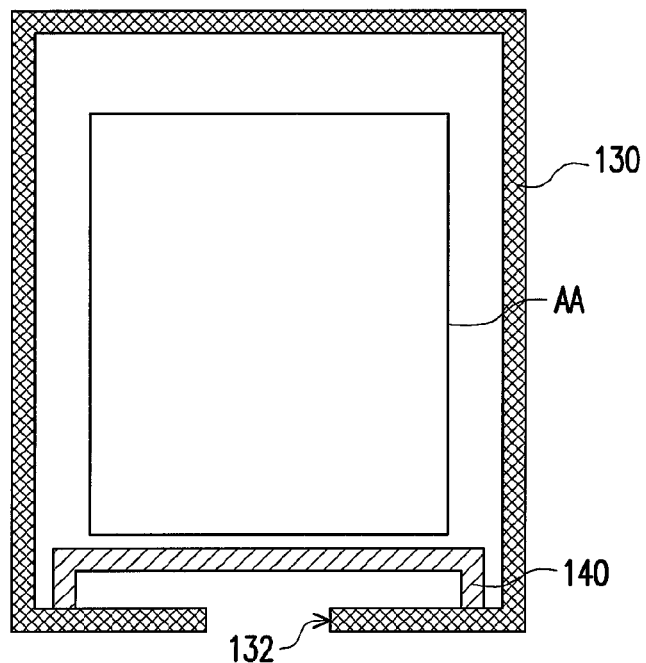

FIG. 11 illustrates a schematic top view of the blocking structure, the active area, the sealant in an LCD panel according to further another embodiment of the invention. Referring to FIG. 11, the blocking structure 140 is, for example, a U-like structure in the present embodiment, and two ends of the blocking structure 140 respectively contact the sealant 130 and the U-like structure surrounds the injection opening 132. It is noted that the corner portion of the U-like blocking structure 140 can have a chamfer angle, or a sharp angle.

Figure 12:
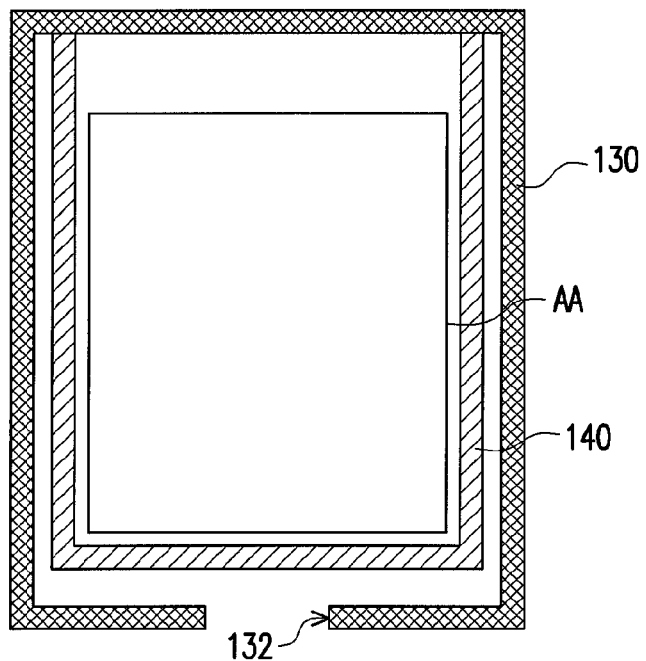

FIG. 12 illustrates a schematic top view of the blocking structure, the active area, the sealant in an LCD panel according to yet another embodiment of the invention. Referring to FIG. 12, the blocking structure 140 is, for example, a U-like structure in the present embodiment, and two ends of the blocking structure 140 respectively contact the sealant 130. In addition, the blocking structure 140 substantially surrounds the active area AA. It is noted that the corner portion of the U-like blocking structure 140 can have a chamfer angle, or a sharp angle.

Figure 13:
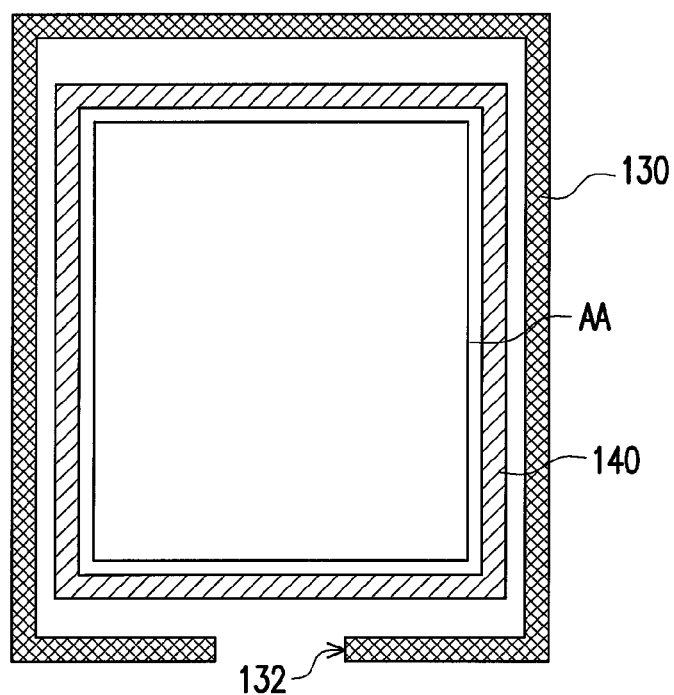

FIG. 13 illustrates a schematic top view of the blocking structure, the active area, the sealant in an LCD panel according to still another embodiment of the invention. Referring to FIG. 13, the blocking structure 140 is, for example, a frame-like or a ring-like structure in the present embodiment, and the blocking structure 140 completely surrounds the active area AA.

As a whole, the embodiments illustrated in FIG. 9 to FIG. 13 all show that the blocking structure 140 of the invention is disposed on the path of the liquid crystal materials flowing from the injection opening 132 into the active area AA. Therefore, the blocking structure 140 is conducive to block the contamination accompanying with the liquid crystal materials, which improves the quality of LCD panel 100.

In summary, in the substrate assembly of the invention, the first substrate has the blocking structure separating the substrate assembly into a first area and a second area, wherein the active area of the first substrate is completely located inside the second area and the distance from the blocking structure to the second substrate is smaller than the cell gap. Therefore, the contamination is blocked and restrained in the first area when the substrate assembly is applied in the vacuum injection process. Accordingly, it is difficult for the contamination to enter into the active area, which prevent from a short circuit generated between the first substrate and the second substrate in the active area. Thus, the LCD panel applying the substrate assembly is characterized by favorable quality.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A substrate assembly, comprising:
a first substrate, having an active area;
a second substrate;
a sealant disposed between the first substrate and the second substrate and the sealant assembling the first substrate with the second substrate and separating the first substrate and the second substrate in a cell gap to define a space, wherein the sealant has an injection opening; and
a blocking structure disposed on the first substrate and located outside the active area, a distance from the blocking structure to the second substrate being smaller than the cell gap and the blocking structure being in contact with the sealant, wherein the blocking structure separates the space into a first area and a second area, the injection opening is merely located at the first area, and the active area is merely located at the second area.

2. The substrate assembly according to claim 1, wherein the wall substantially completely surrounds the active area.

3. The substrate assembly according to claim 1, wherein the blocking structure comprises a plurality of pillar and a gap between adjacent two pillars is smaller than the cell gap.

4. The substrate assembly according to claim 3, wherein two ends of each of the pillars directly contact the first substrate and the second substrate.

5. The substrate assembly according to claim 1, wherein one of the first substrate and the second substrate comprises an active device array, the other of the first substrate and the second substrate comprises a color filter array, and the active device array and the color filter array are opposite to each other and located inside the active area.

6. The substrate assembly according to claim 5, wherein the active device array has at least one organic material layer, and a material of the blocking structure and a material of the organic material layer are the same when the first substrate comprises the active device array.

7. The substrate assembly according to claim 5, further comprising a plurality of spacers disposed between the active device array and the color filter array and a material of the blocking structure and a material of the spacers being the same.

8. The substrate assembly according to claim 5, wherein the first substrate further comprises a padding layer, the blocking structure is disposed on the padding layer, the padding layer and the active device array have the same material when the first substrate comprises the active device array, and the padding layer and the color filter array have the same material when the first substrate comprises the color filter array.

9. The substrate assembly according to claim 5, wherein the second substrate further comprises a padding layer opposite to the blocking structure so as to keep the distance from the blocking structure to the second substrate being smaller than the cell gap, the padding layer and the active device array have the same material when the second substrate comprises the active device array, and the padding layer and the color filter array have the same material when the second substrate comprises the color filter array.

10. An liquid crystal display panel, comprising:
the substrate assembly according to claim 1,
a liquid crystal layer disposed in the space; and
an auxiliary sealant sealing the injection opening.

* * * * *